Figure 1:
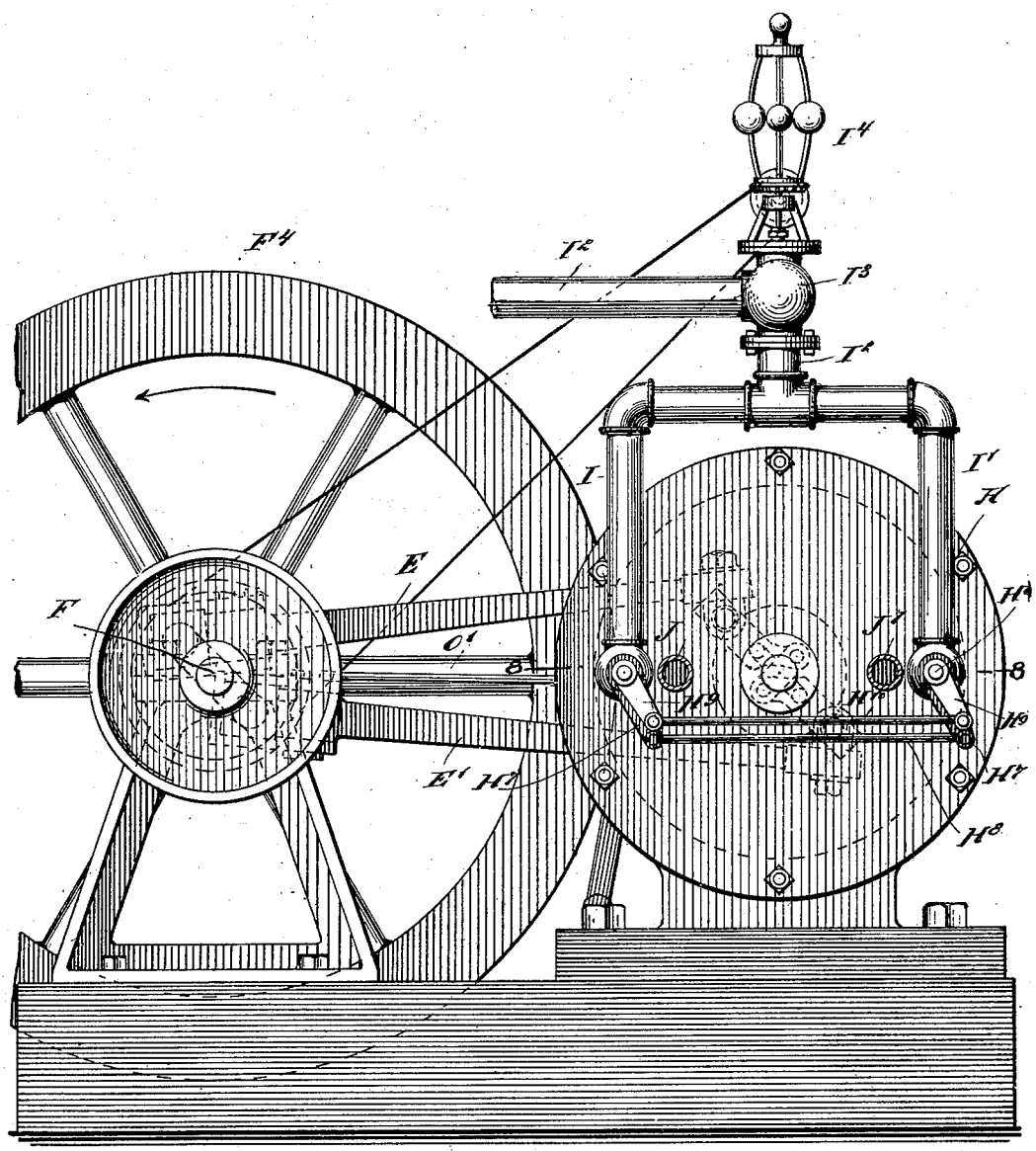

No. 687,628. Patented Nov. 26, 1901.
C. G. HOLMBERG.
ENGINE.
(Application filed Oct. 4, 1900.)
(No Model.) 5 Sheets—Sheet 1.

WITNESSES: INVENTOR
Charles G. Holmberg,
BY
ATTORNEYS

No. 687,628. Patented Nov. 26, 1901.
C. G. HOLMBERG.
ENGINE.
(Application filed Oct. 4, 1900.)
(No Model.) 5 Sheets—Sheet 2.
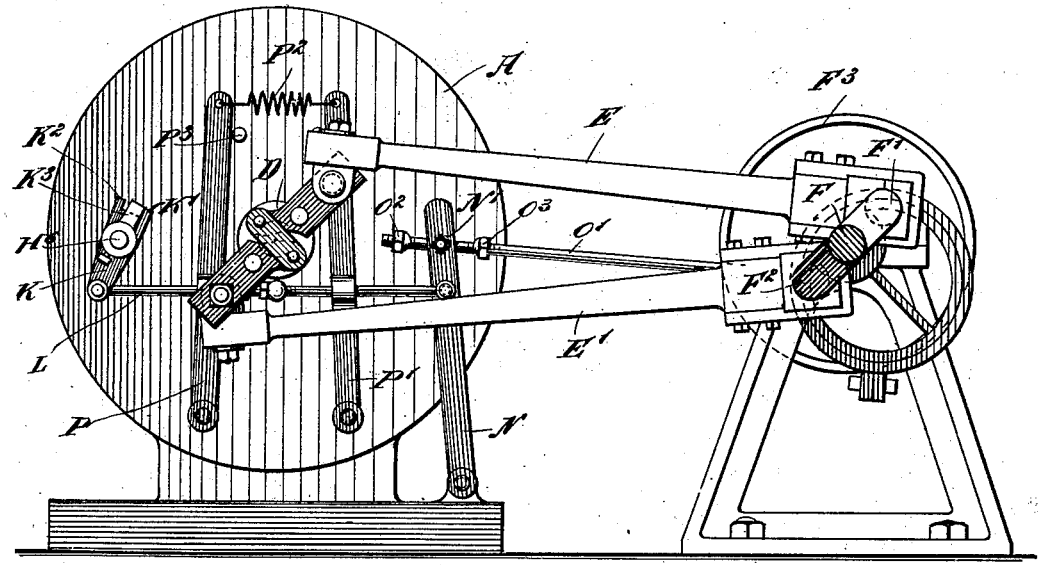
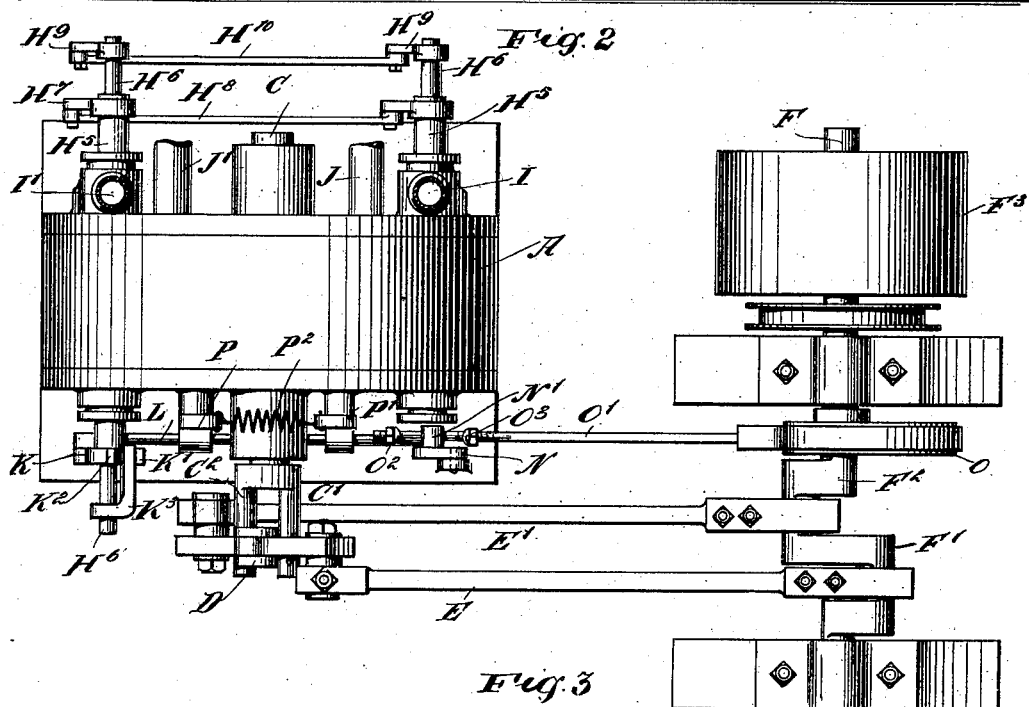
WITNESSES:
INVENTOR
Charles G. Holmberg.
BY
ATTORNEYS No. 687,628. Patented Nov. 26, 1901.
C. G. HOLMBERG.
ENGINE.
(Application filed Oct. 4, 1900.)
(No Model.) 5 Sheets—Sheet 3.
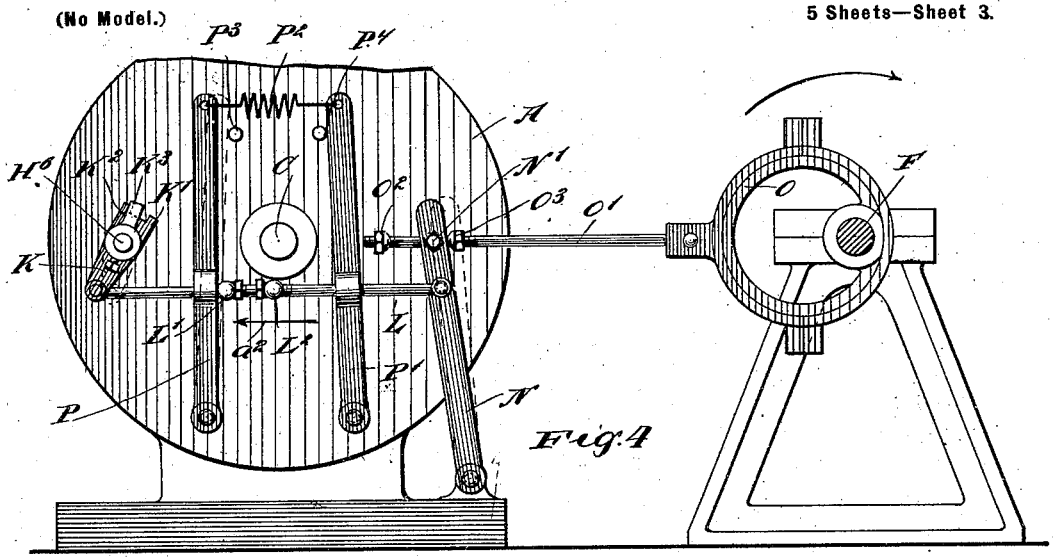
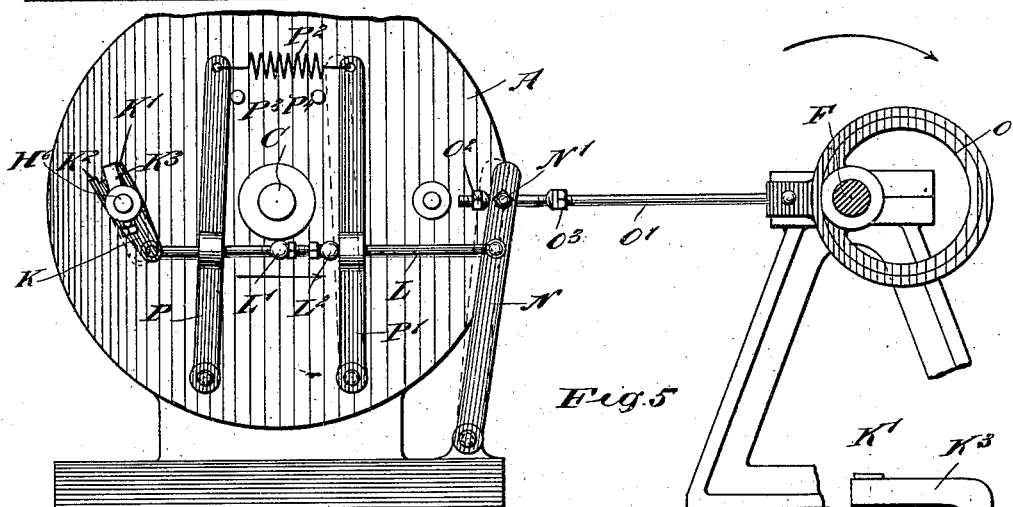
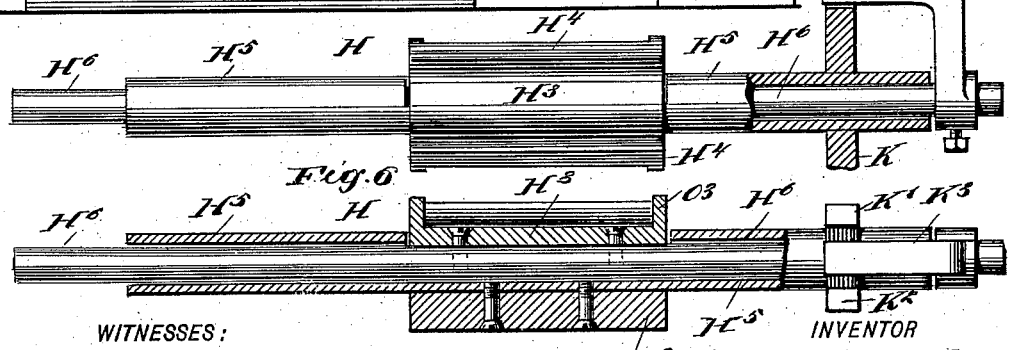
WITNESSES: INVENTOR
Charles G. Holmberg.
BY
ATTORNEYS
THE NORRIS PETERS CO., PHOTO-LITHO., WASHINGTON, D. C.

No. 687,628. Patented Nov. 26, 1901.
C. G. HOLMBERG.
ENGINE.
(Application filed Oct. 4, 1900.)
(No Model.) 5 Sheets—Sheet 4.
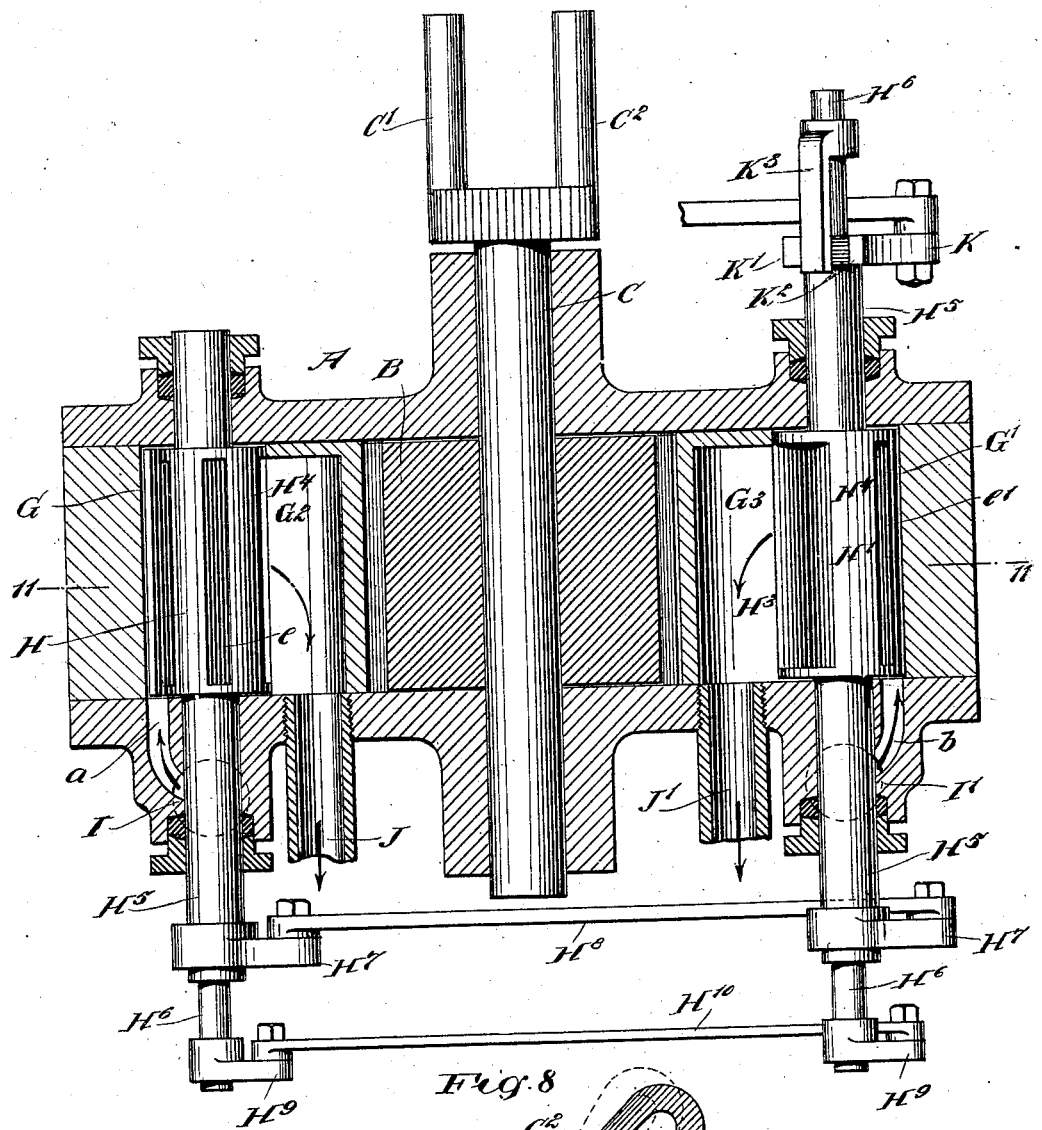
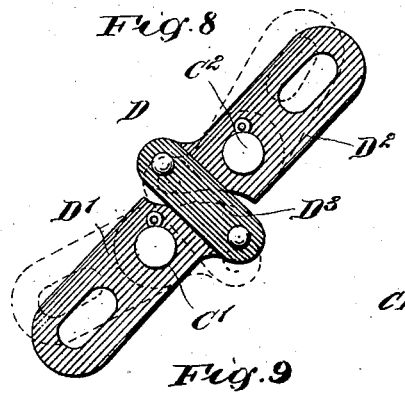
WITNESSES:
INVENTOR
Charles G. Holmberg.
BY
ATTORNEYS No. 687,628. Patented Nov. 26, 1901.
C. G. HOLMBERG.
ENGINE.
(Application filed Oct. 4, 1900.)
(No Model.) 5 Sheets—Sheet 5.
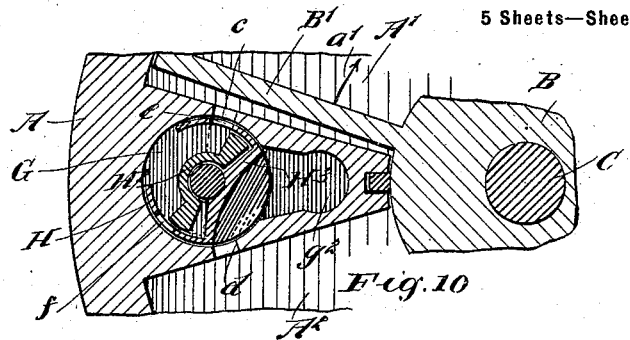
Fig. 10.
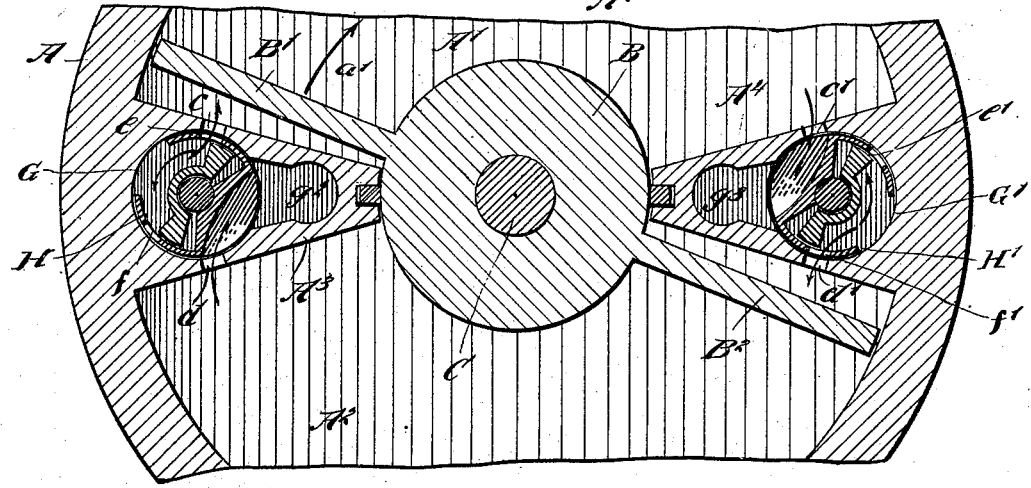
Fig. 11.
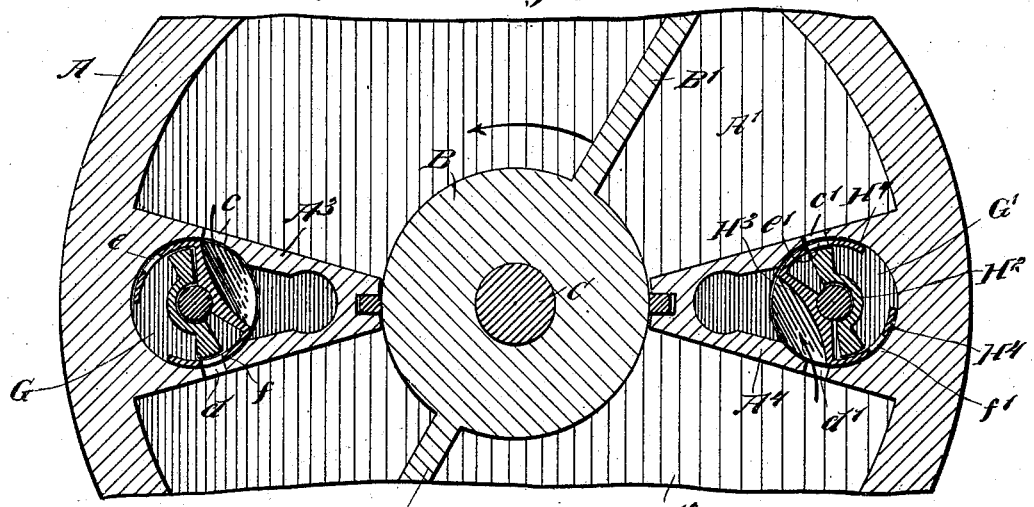
Fig. 12.
WITNESSES: INVENTOR
Charles G. Holmberg.
BY 
ATTORNEYS

UNITED STATES PATENT OFFICE.

CHARLES GUSTAVE HOLMBERG, OF WOONSOCKET, SOUTH DAKOTA, ASSIGNOR TO ANNA HOLMBERG, JOHN M. WHEELER, AND LOREN H. PIER, OF WOONSOCKET, SOUTH DAKOTA.

ENGINE.

SPECIFICATION forming part of Letters Patent No. 687,628, dated November 26, 1901.

Application filed October 4, 1900. Serial No. 31,975. (No model.)

*To all whom it may concern:*

Be it known that I, CHARLES GUSTAVE HOLMBERG, a citizen of the United States, and a resident of Woonsocket, in the county of Sanborn and State of South Dakota, have invented a new and Improved Engine, of which the following is a full, clear, and exact description.

The invention relates to engines having oscillating pistons; and its object is to provide a new and improved engine capable of being driven by steam, compressed air, explosive mixtures, and other fluids under pressure, the engine being arranged to utilize the motive agent to the fullest advantage.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a front elevation of the improvement. Fig. 2 is sectional rear elevation of the same on the line 2 2 in Fig. 3. Fig. 3 is a plan view of the same with the governor and connections removed. Fig. 4 is a rear elevation of the cylinder and mechanism for actuating the valves. Fig. 5 is a similar view of the same with parts in a different position. Fig. 6 is an enlarged side elevation, with part in section, of one of the valves for controlling the motive agent. Fig. 7 is a sectional plan view of the same. Fig. 8 is an enlarged sectional plan view of the cylinder. Fig. 9 is an enlarged side elevation of the crank-arm for connecting the pitmen with the piston-shaft. Fig. 10 is an enlarged sectional side elevation of part of the cylinder, the piston, and one of the valves for controlling the motive agent. Fig. 11 is an enlarged sectional side elevation of the cylinder piston and valves, the section being on the line 11 11 in Fig. 8; and Fig. 12 is a similar view of the same with parts in a different position.

In the cylinder A oscillates a piston B, secured on a transversely-extending shaft C, mounted to turn in suitable bearings in the heads of the cylinder and connected at one outer end by a double crank-arm D with pitmen E E', connected with the crank-arms F' F² of the main driving-shaft F of the engine, said driving-shaft having a pulley F³ for transmitting the rotary motion of the shaft to other machinery. The main shaft is also provided with a fly-wheel F⁴, as shown in Fig. 1.

The cylinder A is formed with two working chambers A' A², formed by partitions A³ A⁴, integral with the cylinder, and into said working chambers A' A² extend the wings or piston-heads B' B² of the piston B, as is plainly shown in Figs. 10, 11, and 12. The piston-heads B' B² stand diametrically opposite each other, and when the engine is running the motive agent acts simultaneously on the said piston-heads in such a manner that one is moved in its working chamber from the partition A³ to the partition A⁴, while the other piston-head is moved in its working chamber, but from the partition A⁴ to the partition A³. In the partitions A³ A⁴ are formed valve-chests G G', respectively, containing oscillating valves H H', respectively, for controlling the motive agent to and from the working chambers A' A², as hereinafter more fully explained.

In one of the heads of the cylinder A are formed ports $a$ $b$, leading at their inner ends to the valve-chests G G' and connected at their outer ends with the motive-agent-supply pipes I I', respectively, connected with the boiler-pipe I², containing a valve I³ under the control of the governor I⁴. The valve-chests G G' are also connected by ports $c$ $c'$ with the working chamber A', and similar ports $d$ $d'$ connect the said chests with the chamber A². The ports $c$ $d$ and $c'$ $d'$ are controlled by the valves H H', respectively, so that motive agent is admitted to one chamber A' or A² while exhaust takes place from the other chamber through the corresponding valve, the exhaust motive agent passing from chest extensions G² G³ to exhaust-pipes J J', leading to the outer air.

The valves H H' are alike in construction, and each is provided with a main valve H² and an auxiliary valve H³, having cut-off flanges H⁴, as is plainly indicated in the drawings. The main valve H² is secured on a hollow stem H⁵, and the auxiliary valve H³ is secured on a stem H⁶, mounted to turn in the hollow stem H⁵. (See Figs. 6 and 7.) The hollow stem H⁵ is mounted to turn in suitable bearings carried by the heads of the cylinder A, and the outer ends of the stems H⁵ carry arms H⁷, pivtoally connected with each other by a link H⁸, so that when a rocking motion is given to one of the stems H⁵ then both stems for the valves H H' are simultaneously rocked. The stems H⁶ for the two valves H H' are similarly connected with each other—that is, they are provided with arms H⁹, pivotally connected with each other by a link H¹⁰, and consequently when one of the stems H⁶ is rocked a similar rocking motion is given to the other stem. In the cut-off flanges H⁴ for the valve H are formed ports $e\ f$, adapted to register with the ports $c\ d$ in the partition A³, and similar ports $e'\ f'$ are also formed in the cut-off flanges H⁴ for the valve H', and the ports $e'\ f'$ are adapted to register with the ports $c'\ d'$. (See Figs. 11 and 12.)

In order to impart the desired oscillating motion to the valves, the stem H⁵ of the valve H' is provided with an arm K, arranged to receive motion from the main driving-shaft F by the mechanism hereinafter more fully described, and said arm K is formed on its upper end with shoulders K' K², adapted to alternately engage the free end of an arm K³, secured to the stem H⁶, so that the rocking motion of the latter is controlled from the stem H⁵, it being understood that upon swinging the arm K in one direction one shoulder K' or K² engages the arm K³ and carries the latter along, and when the arm K is on the return stroke the arm K³ remains at a standstill for the time being until the other shoulder K² or K' engages the arm K³ and again carries the same along. The lower end of the arm K is pivotally connected by a link L with an arm N, fulcrumed at its lower end on the frame of the engine, said arm carrying near its upper end a pin N', loosely engaging the free end of an eccentric-rod O' of an eccentric held on the main shaft F of the engine. The pin N' is adapted to be engaged by adjustable lugs O² O³ on the eccentric-rod O', said lugs being preferably screwed on the eccentric-rod, so as to permit proper adjustment of the same, according to the time the cut-off is to take place in the valves H H'. On the link L, previously mentioned, are held adjustable lugs L' L², adapted to alternately engage arms P P', fulcrumed at their lower ends on one of the cylinder-heads, the upper ends of said arms being connected with each other by a spring P² to draw the arms toward each other and against stop-pins P³ P⁴, projecting from the cylinder-head. When the engine is in motion, the eccentric O by the lugs O² O³ imparts an intermittent swinging motion to the arm N, and this movement of the arm is transmitted by the link L to the arm K, so that the two valves H H' are simultaneously actuated to cause the valve H to admit live motive agent to one working chamber and to allow the exhaust of the other working chamber to pass to the open air, while the other valve H' admits motive agent to the last-mentioned chamber and allows escape of exhaust motive agent from the first working chamber. Thus when the several parts are in the position shown in Fig. 10 the live motive agent passes through the valve H and the registering ports $e\ c$ into the chamber A' behind the piston-head B', so as to turn the piston B in the direction of the arrow $a'$, it being understood that a like action takes place against the other piston-head B² by the motive agent passing through the valve H' and the registering ports $f'$ and $b'$ into the working chamber A². When the ports $e$ and $f'$ are in register with the ports $c$ and $d'$ and a sufficient quantity of motive agent has been admitted to the chamber A', as described, then the rocking motion given to the arm K by the eccentric O and intermediate connections causes the main valve H² to turn, while the auxiliary valve H³ remains stationary for the time being, it being understood that when this movement of the main valve takes place the motive agent is gradually cut off from the ports $e$ and $f'$, and consequently from the ports $c$ and $d'$ and the working chambers A' A². When the motive agent has finally been cut off, the shoulder K' or K² on the rocking arm K engages the free end of the arm K³ and carries the same along, so that the main valves H² and their auxiliary valves H³ move together, the motive agent being cut off during the time the piston-heads B' B² are on their outward stroke. Thus if the motive agent is steam it works expansively in the working chambers A' A². When the piston-heads have reached the ends of their strokes, the position of the valves is reversed by the action of the eccentric and the parts connecting the eccentric with the arm K, so that the motive agent is again admitted to the working chambers to move the piston-heads B' B² on their return stroke—that is, in the inverse direction of the arrow $a'$. (See Fig. 11.)

It is understood that when the link L moves in the direction of the arrow $a^2$ (see Fig. 4) besides imparting a rocking motion to the arm K it imparts a swinging motion to the arm P, so that the latter is moved away from its stop-pin P³ and the spring P² is placed under tension. When the eccentric O is on the return stroke and the lug O³ moves away from the arm N, then the spring P² draws the arm P back to its former position against the stop-pin P³ and in doing so imparts movement to the link L in the inverse direction of the arrow $a^2$, so that the arm K is rocked, while the arm K³ remains stationary to cause the movement of the main valves H² of the valves H H' for cutting-off purposes, as above explained. On a further movement of the eccentric-rod O' to the right the lug O² finally comes in contact with the arm N and swings the same to the right, and with it the arm K, by the action of the link L, and when the eccentric O nears the end of the stroke to the right then the lug L² engages the arm P' and swings the same away from its stop-pin P⁴ and at the same time places the spring P² under tension, so that upon the return stroke of the eccentric O and its rod O' the arm N, and with it the arm K, receive a short swinging motion owing to the return movement of the arm P' caused by the spring P², said arm pressing against the lug L² in the inverse direction of the arrow $a^2$.

From the foregoing it is evident that by the operator adjusting the lugs O² O³ on the eccentric-rod O' and the lugs L' L² on the link L any desired time of cut-off can be given to the valves H H' for admitting more or less motive agent to the working chambers A' A², as may be desired.

The crank-arm D, connected with the pitmen E E', is made in sections D' D², pivotally connected with each other at adjacent ends by a link D³, said sections being secured on the fork-arms C' C², carried by the cylinder-shaft C, as is plainly indicated in Figs. 8 and 9. The pitmen E E' have adjustable connection at their wrist-pins with the sections D' D², it being understood that the sections partly close and open alternately, owing to the link D³, at the time the crank-arms F' F² pass over their dead-center positions, and consequently the sections D' D² stand at angles to one another to avoid dead-center positions.

Having thus fully described my invention, I claim as new and desire to secure by Letters Patent—

1. An engine having a cylinder with two working chambers, a piston oscillating therein and having piston-heads, one for each working chamber, and valves each controlling the inlet and exhaust of the motive agent to and from said working chambers at one side of the piston-heads, the said valves each comprising a main valve, and an auxiliary valve controlled from the main valve, as set forth.

2. An engine having a cylinder formed with working chambers separated by fixed partitions, each of which has a valve-chest provided with ports connecting said valve-chest with said working chambers, a piston oscillating in said cylinder and having piston-heads, one for each working chamber, and valves oscillating in said chests, for controlling the inlet and exhaust of the motive agent, each valve comprising a main valve and an auxiliary valve, the auxiliary valve being controlled from the main valve, as set forth.

3. An engine having a cylinder formed with working chambers separated by fixed partitions, each of which has a valve-chest provided with ports connecting said valve-chest with said working chambers, a piston oscillating in said cylinder and having piston-heads, one for each working chamber, valves oscillating in said chests for controlling the inlet and exhaust of the motive agent, each valve comprising a main valve and an auxiliary valve, the auxiliary valve being controlled from the main valve, and means for actuating said main valves, as set forth.

4. An engine, comprising a cylinder formed with working chambers separated by fixed partitions, each of said partitions having a valve-chest provided with ports connecting said valve-chest with said working chambers, one of the heads of said cylinder being provided with ports leading at their inner ends to the said valve-chests and connected at their outer ends with the motive-agent-supply pipes, a piston oscillating in said cylinder and having piston-heads one for each working chamber, valves in said chests for controlling the inlet and exhaust of the motive agent, each valve comprising a main valve, and an auxiliary valve, means for imparting motion to the main valve, and means for controlling the auxiliary valve from the main valve, as set forth.

5. An engine comprising a cylinder, fixed partitions in said cylinder dividing the same into two working chambers, a valve-chest in each partition provided with ports connecting said valve-chest with the working chambers, the said valve-chests being provided with chamber extensions arranged in the said partitions and closed at their inner ends, the said chamber extensions leading to exhaust-pipes connected with one of the cylinder-heads, a piston oscillating in said cylinder and having piston-heads one for each working chamber, and valves in said valve-chests for controlling the inlet and exhaust of the motive agent, as set forth.

In testimony whereof I have signed my name to this specification in the presence of two subscribing witnesses.

CHARLES GUSTAVE HOLMBERG.

Witnesses:
L. H. PIER,
H. S. SMYTHE.